United States Patent [19]
DeWees

[11] Patent Number: 5,131,487
[45] Date of Patent: Jul. 21, 1992

[54] VEHICLE FRAME

[76] Inventor: Lester V. DeWees, 2859 State Rte. 132, New Richmond, Ohio 45157-9542

[21] Appl. No.: 691,525

[22] Filed: Apr. 25, 1991

[51] Int. Cl.⁵ ............................................. B60R 21/00
[52] U.S. Cl. ..................... 180/271; 280/727; 209/203
[58] Field of Search ............... 280/727, 781, 784, 785; 296/203, 205; 180/271, 89.1; 293/1, 15, 16

[56] References Cited

U.S. PATENT DOCUMENTS

| | | | |
|---|---|---|---|
| 2,269,451 | 1/1942 | Ford | 296/205 |
| 3,292,969 | 12/1966 | Eggert | 296/205 |
| 4,171,141 | 10/1979 | Hobrecht . | |
| 4,453,763 | 6/1984 | Richards . | |
| 4,795,188 | 1/1989 | Dueker . | |

FOREIGN PATENT DOCUMENTS

| | | | |
|---|---|---|---|
| 987481 | 4/1951 | France | 296/203 |
| 2559119 | 8/1985 | France | 280/781 |
| 506840 | 12/1954 | Italy | 296/205 |
| 2220172 | 1/1990 | United Kingdom | 296/205 |

*Primary Examiner*—H. Grant Skaggs
*Attorney, Agent, or Firm*—Terry M. Gernstein

[57] ABSTRACT

An integral, one-piece frame is mounted on a land vehicle, such as a pickup truck, and surrounds that vehicle. The frame includes a front grille section, a cab section and a cargo bed section. Undercarriage crossframe members are connected to the frame and include straps to connect the frame to the vehicle.

10 Claims, 3 Drawing Sheets

VEHICLE FRAME

TECHNICAL FIELD OF THE INVENTION

The present invention relates to the general art of land vehicles, and to the particular field of accessories for protecting land vehicles from damage due to accidents.

BACKGROUND OF THE INVENTION

The pickup truck has become extremely popular in recent times. Not only are such land vehicles owned by farmers and construction workers, many people are owning these vehicles for recreational use, as in off-road driving and the like.

As with any land vehicle, damage to the vehicle can be costly and inconvenient. However, due to the nature of the pickup truck, these vehicles are often subjected to situations that create a possibility of damage to the vehicle more often than many other forms of vehicle. For example, pickup trucks are often used in camping and off-road situations where the possibility of collision or other such accident is much greater than in the normal on-road situation.

While the art has included disclosures of accessories, such as roll bars, that are intended to protect some portion of a land vehicle, such as the cab portion, from damage due to an accident, many of these devices are expensive to install, and still do not provide full body protection for the vehicle. The art also contains some proposals for protecting several parts of a vehicle. However, these devices are also expensive and difficult to install, and may not be aesthetically pleasing. These devices may also be extremely heavy thereby wasting fuel and making the vehicle difficult to handle.

Therefore, there is a need for a frame that protects a pickup from damage due to an accident, yet which is easily and inexpensively installed and which will protect a great deal of the pickup without being unsightly in appearance or being heavy.

OBJECTS OF THE INVENTION

It is a main object of the present invention is to provide a frame that protects a pickup from damage due to an accident.

It is another object of the present invention to provide a frame that protects a pickup from damage due to an accident, yet which is easily and inexpensively installed.

It is another object of the present invention to provide a frame that protects a pickup from damage due to an accident, and which will protect a great deal of the pickup without being unsightly in appearance.

It is another object of the present invention to provide a frame that protects a pickup from damage due to an accident, and which will protect a great deal of the pickup without being unsightly in appearance and without being unduly heavy.

SUMMARY OF THE INVENTION

These, and other, objects are achieved by an integral, one-piece, monolithic frame that is mounted on a pickup truck. The frame is affixed to the pickup using cross-frame support bars attached to the undercarriage of the truck, and extends from in front of the front bumper of the truck to behind the aft bumper on both the port side and the starboard side of the truck. The frame also extends over the roof of the cab truck section, and has access openings for the doors of the vehicle and the windows of that vehicle.

The frame is thus easily installed as by welding or the like, yet will provide full body protection for the vehicle as well as being aesthetically pleasing in appearance. The cage nature of the frame makes it as light as possible, and thus does not unduly add to overall vehicle weight.

BRIEF DESCRIPTION OF THE DRAWING FIGURES

DETAILED DESCRIPTION OF THE PREFERRED EMBODIMENT OF THE INVENTION

Figure 1:
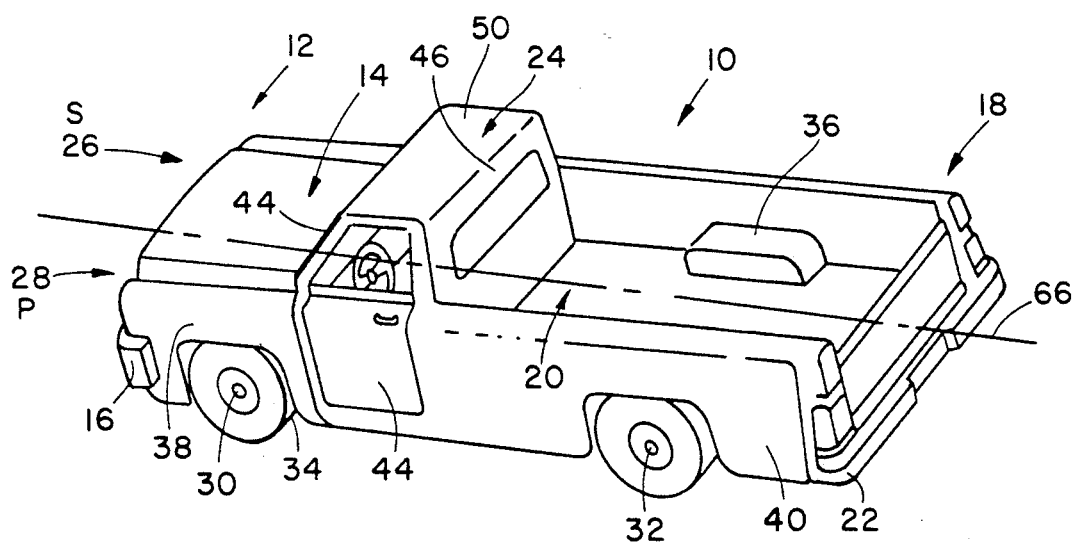
FIG. 1 is a top and rear perspective view of a standard pickup truck type land vehicle.

Shown in FIG. 1 is a standard pickup truck 10 having a forward section 12 containing an engine compartment section 14, and having a front bumper 16 attached thereto, an aft section 18 containing a cargo bed section 20 and a rear bumper 22, with a cab section 24 positioned between the forward and the aft sections. The truck 10 includes an outer body that is bilaterally symmetric about a longitudinal centerline CL extending from the front bumper 16 to the rear bumper 22 and dividing the vehicle into identical starboard and port side sections 26 and 28 respectively. The vehicle 10 further includes an undercarriage that includes front and rear wheel axles 30 and 32 respectively and a transmission mechanism connecting an engine in the engine compartment section to wheels located in wheel wells, such as portside forward wheel well 34 and starboard side aft wheel well 36, respectively, defined in forward port side fender 38 and in aft portside fender 40 respectively. The vehicle also contains the usual braking and exhaust treatment accessories. The vehicle cab section 24 includes access doors, such as portside access door 44 as well as a windshield section 46 and a rear window section 46 with a roof 50 connecting these cab sections.

Figure 2:
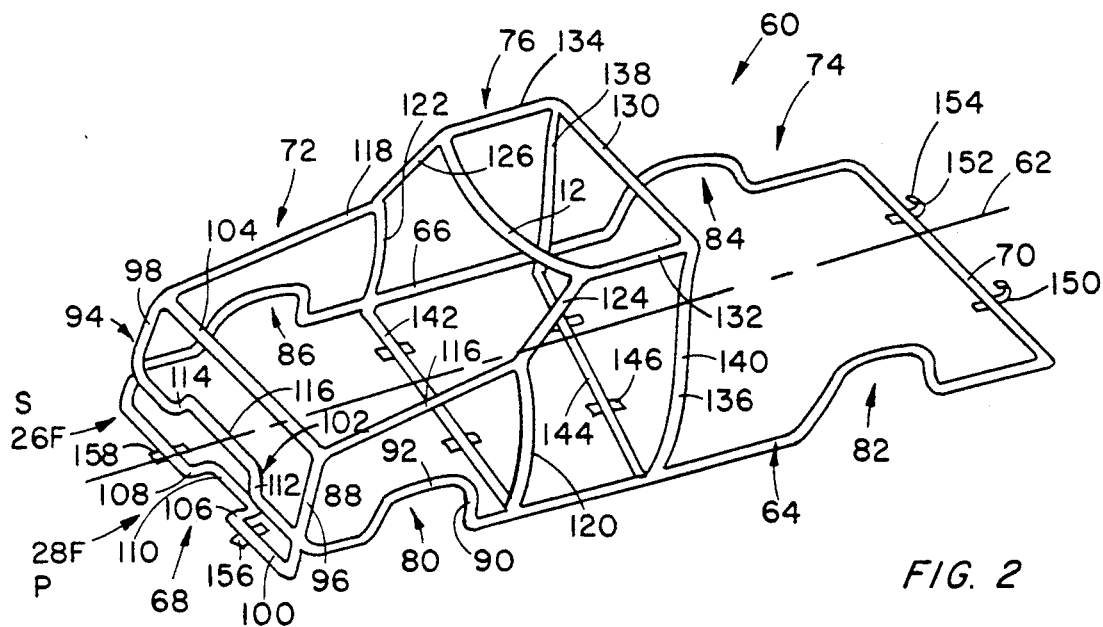
FIG. 2 is a front, top and starboard side view of a frame embodying the present invention.

A frame 60 is shown in FIG. 2 and is mounted on the vehicle 10 to protect the outer body from damage. The frame 60 is an integral, one-piece monolithic unit that is bilaterally symmetric about a longitudinal centerline 62 to have a starboard side section 26F and a starboard side section 28F. The one-piece nature of the frame facilitates the installation of the frame as well as increases its strength. The frame 60 includes a port side axially extending frame element 64 and a starboard side axially extending frame element 66 that extend from a forward bumper section 68 rearwardly of the frame 60 to an aft crossframe element 70 that is located immediately adjacent to the rear bumper 22 of the vehicle 10 when the frame is in place on that vehicle. The frame 60 has a length dimension measured between the forward bumper section 68 to the aft crossframe element 70 along the longitudinal centerline that is greater than the length dimension of the vehicle as measured between the vehicle front and rear bumpers 16 and 22.

The frame 60 is divided into a front engine section 72, a cargo bed section 74 and a cab section 76 located between the front engine section and the cargo bed section and encases the entire frame of the vehicle when in place on that vehicle.

Figure 3:
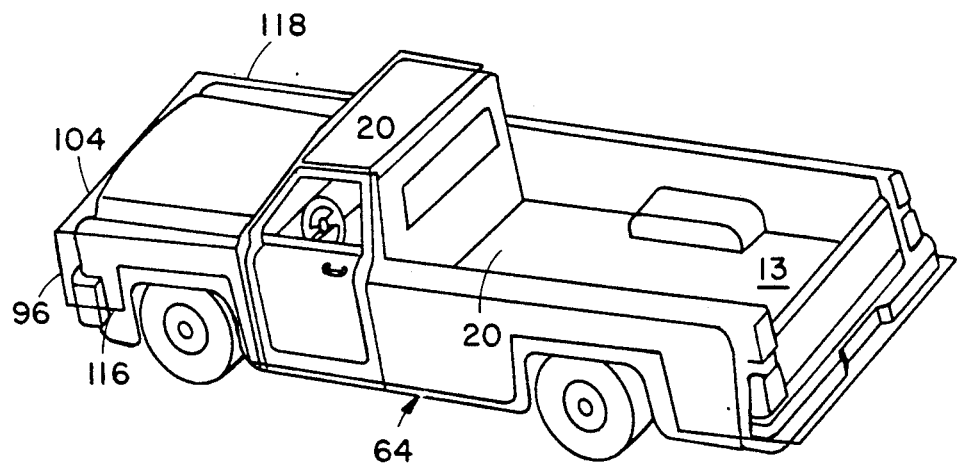
FIG. 3 is a perspective view of the pickup truck shown in FIG. 1 with the frame of the present invention mounted thereon.

As shown in FIGS. 2 and 3, the axially extending frame elements 64 and 66 include wheel well accommodating sections 80, 82, 84 and 86 formed by forward upright elements 88 connected to rear upright elements 90 by axially extending elements 92 all connected together to form a downwardly-opening U shape that is sized and located to be outwardly adjacent to the wheel wells as shown in FIG. 3.

The front engine section 72 includes a grille section 94 formed of a grille section portside upright 96 connected to the forward end of the portside axially extending element 64 and extending upwardly when the frame is in the in-use condition shown in FIGS. 2 and 3, and a grille section starboard side upright 98 connected to the forward end of the starboard side axially extending frame element 66. A lowermost grille section crossframe element 100 connects the bottom ends of the grille section upright elements 96 and 98 and is located immediately subadjacent to the vehicle front bumper 16 when the frame 60 is mounted on that vehicle. A grille section middle crossframe element 102 is connected to the grille section upright elements and extends immediately in front of the grille of the vehicle, and a grille section top most crossframe element 104 is connected at each end thereof to the top ends of the grille section upright elements 96 and 98 and extends just above the top of the vehicle grille section as shown in FIG. 3. The lowermost crossframe element 100 includes a U-shaped opening defined by portside rearwardly extending element 106 and starboard side rearwardly extending element 108 connected by crossframe extending element 110, and accommodates a vehicle license plate. The middle crossframe element 102 includes a U-shaped opening defined by portside upwardly extending element 112 and starboard side upwardly extending element 110 connected by crossframe extending element 112, and further accommodates the vehicle license plate.

The front engine section 72 includes a portside axially extending element 116 connected at one end thereof to the grille section portside upright element 96 and a starboard side axially extending element 118 connected at one end thereof to the grille section starboard side upright element 98. The front engine section axially extending elements are located to be immediately adjacent to the top surfaces of the vehicle front fenders as indicated in FIG. 3. Starboard side and a port side midlocation downwardly extending elements 120 and 122 respectively define the aft boundary of the front engine section 72 on each side of the frame 60. The elements 120 and 122 connect the rear ends of the elements 116 and 118 respectively to the elements 64 and 66 and are located to be immediately forwardly adjacent to the rear boundaries of the vehicle front fenders and immediately forwardly adjacent to the front edges of the vehicle doors as indicated in FIG. 3.

The cab section 76 of the frame 60 is defined by the elements 120 and 122 connected at an upper end thereof to starboard and port side windshield upwardly extending elements 124 and 126 respectively and cab section forward crossframe element 128 connecting the elements 122 and 124 and being located immediately superadjacent to the windshield of the cab when the frame is in place A rear cab section cross frame element 130 extends across the cab immediately forwardly and super- adjacent to the cab rear wall 46. The element 130 is connected at each end thereof to the front crossframe element 128 by cab section starboard side and port side axially extending elements 132 and 134 that are located immediately superadjacent to and just outside of the top of the vehicle doors 44 with the frame elements 64 and 66 being located immediately outside and beneath those vehicle doors when the frame 60 is in place on the vehicle. The cab section is completed by two cab section upright elements 136 and 138 located on the starboard side and the portside of the frame respectively and connected at an upper end to the elements 132 and 134 and at a lower end to the elements 64 and 66 respectively. The elements 136 and 138 are located immediately adjacent to and rearward of the vehicle doors as shown in FIG. 3. Each element 136 and 138 has a curved section, such as section 140 of element 136, that accommodates the curve of the vehicle adjacent to the vehicle door.

A forward midsection crossframe element 142 and a rear midsection crossframe element 144 are connected as by welding or the like, to the frame elements 64 and 66 and are located beneath the cab section 76 to be positioned beneath the vehicle when the frame is in position on the vehicle and the elements 142 and 144 are connected thereto. The frame 60 is one piece and the frame elements 142 and 144 are connected thereto after the frame is positioned on the vehicle. Strap elements, such as strap element 148, are fixed to the elements 142 and 144 and are affixed, as by welding, or the like to adjacent vehicle elements to attach the frame to the vehicle. J-shaped aft strap elements, such as elements 150 and 152 are affixed to the element 70 and are attached at a short leg 154 thereof to the vertical surface of the vehicle rear bumper 22 as by butt welding or the like, while forward strap elements 156 and 158 are mounted on the element 100 to be affixed to the vehicle front bumper 16. The elements 156 and 158 can also be J-shaped similar to the elements 150 and 152 with short legs thereof connected to the front bumper vertical surface as by butt welding or the like.

The frame 60 is mounted on a vehicle by simply lowering that frame onto the vehicle from above, then attaching the elements 142 and 144 to the frame elements 64 and 66, and then attaching the strap elements to adjacent elements of the vehicle. The mounted frame completely surrounds the vehicle while being light, easy to attach and aesthetically pleasing.

Figure 4:
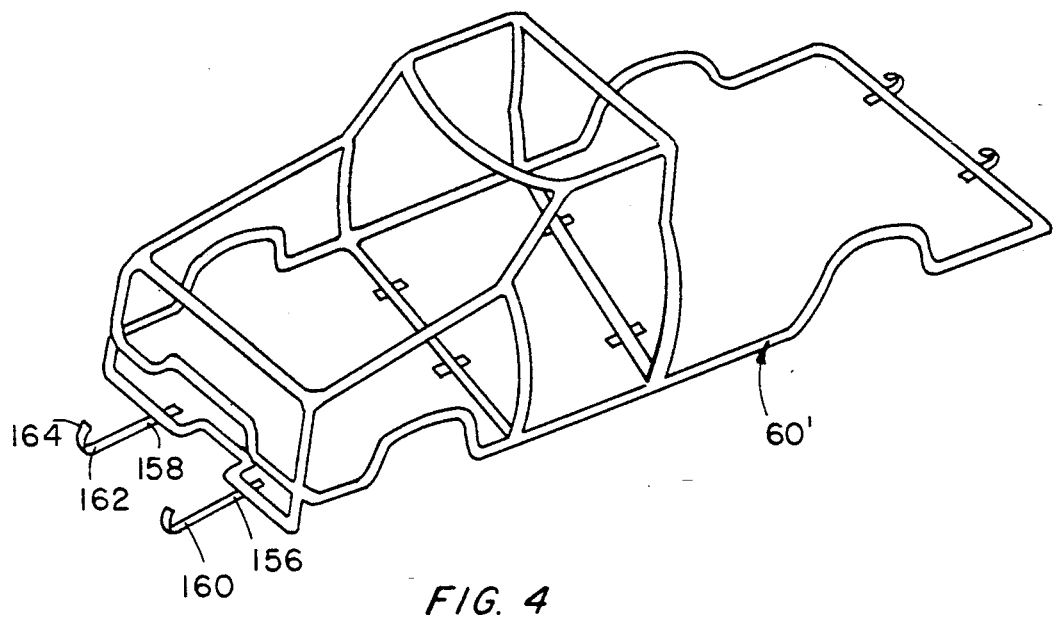
FIG. 4 is a front, top and starboard side view of a second form of the frame embodying the present invention in which front bumper protection elements are included.
Figure 5:
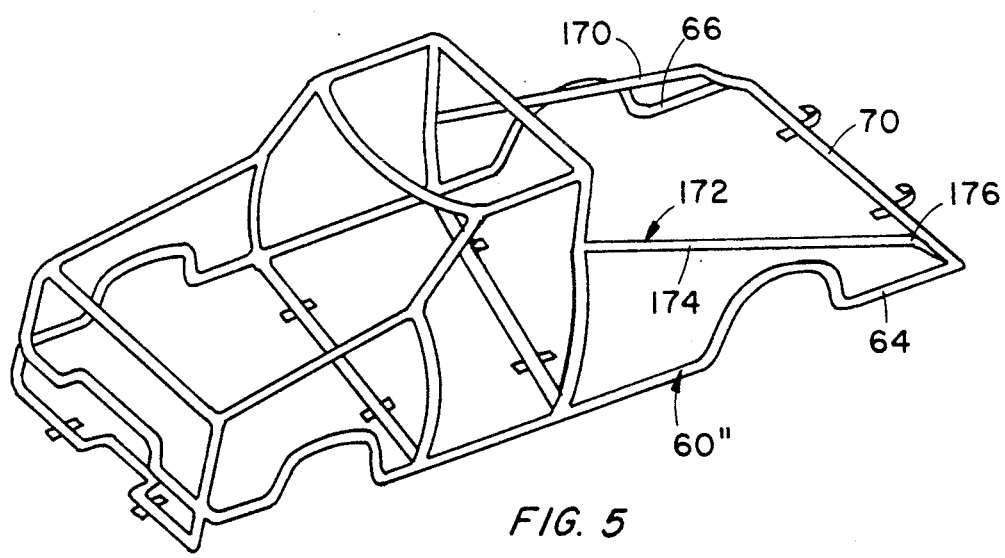
FIG. 5 is a front, top and starboard side view of another frame embodying the present invention in which further protective bars are included to protect the cargo bed portion of the vehicle.

Alternative forms of the frame are shown in FIGS. 4 and 5, with frame 60' shown in FIG. 4 being identical to the frame 60 shown in FIG. 2 but having special bumper guards 160 and 162 mounted to the straps 156 and 158, respectively. The special bumper guards 160 and 162 are J-shaped with a curved short leg, such as leg 164 located forwardly of the front bumper 16 when the frame 60' is in place on the vehicle.

Frame 60" shown in FIG. 5 is identical to the frame 60 but includes a cargo bed starboard side upper frame element 170 and a cargo bed port side upper frame element 172. Each of the elements 170 and 172 is connected at one end thereof to an upright element 138 or 140 and at another end thereof to the intersection of the axial frame elements 64 and 66 and the rear crossframe element 70. Each element 170 and 172 has a long section, such as section 174 and a short section, such as section 176 and is located immediately outside of the vehicle cargo bed section outer walls and immediately above the rear wheel wells.

The preferred form of the frame 60 is formed of 1.9" OD steel tubing, and preferably is sized to provide a 2" clearance on all sides and surfaces of the vehicle when the frame is in place on that vehicle. U-bolts can be used in place of or in conjunction with the above-discussed welds to attach the frame to the vehicle if suitable. The frame can be used on a two or four wheel drive vehicle or the like.

It is understood that while certain forms of the present invention have been illustrated and described herein, it is not to be limited to the specific forms or arrangements of parts described and shown.

I claim:

1. In a land vehicle having a front bumper, a rear bumper, a cab section having a windshield on a front section thereof and a rear wall on a rear section thereof a starboard side door and a port side door, a front engine compartment located between the front bumper and the cab section, a cargo bed section located between the cab section and the rear bumper, doors on the cab section, a longitudinal centerline extending from the front bumper to the rear bumper and dividing the land vehicle into a starboard side and a port side, wheel wells on the starboard and port sides of the vehicle, the improvement in combination therewith comprising:

an integral, one-piece, monolithic frame mounted on the vehicle and surrounding the vehicle, said frame including (1) a starboard side axial frame element having a front end located in front of the vehicle front bumper and a rear end located in back of the vehicle rear bumper, (2) a port side axial frame element having a front end located in front of the vehicle front bumper and a rear end located in back of the vehicle rear bumper, (3) two U-shaped wheel wells in each of said axial frame elements, each wheel well including a front upright element, a rear upright element and an axially extending element connecting said front and rear upright elements together and being located immediately above and adjacent to one of the vehicle wheels, (4) a grille section starboard side upright element connected to said starboard side axial frame element front end and including a top end, (5) a grille section port side upright element connected on one end thereof to said starboard side axial frame element front end and including a top end, (6) a grille section lowermost crossframe element connected at one end to said grille section starboard side upright element and at another end thereof to said grille section port side upright element and extending across the vehicle in front of the vehicle front bumper, said grille section lowermost crossframe element including a U-shaped section having two axially extending legs connected by a crossframe extending leg, (7) a grille section uppermost crossframe element connected at one end to said grille section starboard side upright element upper end, and at another end thereof to said grille section port side upright element upper end and extending across the vehicle in front of and above the vehicle grille, (8) a grille section middle crossframe element connected at one end to said grille section starboard upright element at an intersection of said grille section starboard side upright element and said starboard side axial frame element and at another end thereof to said grille section port side upright element at an intersection of said grille section port side upright element and said port side axial frame element and extending across the vehicle in front of the vehicle grille, said grille section middle crossframe element including a U-shaped section having two axially extending legs connected together by a crossframe extending bight leg, (9) an engine section starboard side axial frame element connected at one end thereof to said grille section starboard side upright frame element top end and extending axially of the vehicle toward the vehicle rear bumper and having a rear end located forwardly adjacent to the vehicle windshield,

(10) an engine section port side axial frame element connected at one end thereof to said grille section port side upright frame element top end and extending axially of the vehicle toward the vehicle rear bumper and having a rear end located forwardly adjacent to the vehicle windshield,

(11) a cab section starboard side upright frame element connected at a lower end thereof to a rear end of said engine section starboard side axial frame element and extending to a top end located above the vehicle cab roof adjacent to the vehicle windshield,

(12) a cab section port side upright frame element connected at a lower end thereof to a rear end of said engine section port side axial frame element and extending to a top end located above the vehicle cab roof adjacent to the vehicle windshield,

(13) a cab section starboard side axial frame element connected at a forward end thereof to the cab section starboard side upright frame element top end and extending axially of the vehicle towards the vehicle rear bumper to a rear end located above and behind the vehicle cab roof,

(14) a cab section port side axial frame element connected at a forward end thereof to the cab section port side upright frame element top end and extending axially of the vehicle towards the vehicle rear bumper to a rear end located above and behind the vehicle cab roof,

(15) a cab section forward crossframe element connected at one end thereof to said cab section starboard side axial frame element at an intersection of said cab section starboard side axial frame element and said cab section starboard side upright frame element top end and extending across the vehicle cab section above and immediately adjacent to the vehicle windshield,

(16) a cab section rear crossframe element connected at one end thereof to said cab section starboard side axial frame element rear end and at another end thereof to said cab section port side axial frame element rear end and extending across the vehicle cab section above and immediately adjacent to the vehicle cab rear wall,

(17) a cab section rear starboard side upright frame element having a top end and a bottom end with said cab section rear starboard side upright frame element top end being connected to said cab section starboard side axial frame element rear end and said cab section rear starboard side upright frame element lower end being connected to said starboard side axial frame element and being located immediately adjacent to and behind the vehicle starboard side door,

(18) a cab section rear port side upright frame element having a top end and a bottom end with said cab section rear port side upright frame element top end being connected to said cab section starboard side axial frame element rear end and said cab section rear port side upright frame element lower end being connected to said port side axial frame element and being located immediately adjacent to and behind the vehicle port side door,

(19) a cab section forward starboard side upright frame element having a bottom end connected to said starboard side axial frame element and a top end connected to said engine section starboard side axial frame element rear end and being located adjacent to and forward of the vehicle starboard side door,

(20) a cab section forward port side upright frame element having a bottom end connected to said port side axial frame element and a top end connected to said engine section port side axial frame element rear end and being located adjacent to and forward of the vehicle port side door, and

(21) a cargo bed section rear crossframe element connected at one end thereof to said starboard side axial frame element rear end and at another end thereof to said port side axial frame element rear end and extending across the vehicle adjacent to the vehicle rear bumper.

2. The improvement defined in claim 1 further including a forward undercarriage crossframe element connected at one end thereof to said starboard side axial frame element adjacent to said cab section forward starboard side upright element and at another end thereof to said port side axial frame element adjacent to said cab section forward port side upright frame element.

3. The improvement defined in claim 2 further including a rear undercarriage crossframe element connected at one end thereof to said starboard side axial frame element adjacent to said cab section rear starboard side upright element and at another end thereof to said port side axial frame element adjacent to said cab section rear port side upright frame element.

4. The improvement defined in claim 3 further including connecting straps fixed to said forward and said rear undercarriage crossframe elements.

5. The improvement defined in claim 4 further including two J-shaped connector straps on said cargo bed section rear crossframe element.

6. The improvement defined in claim 5 further including two J-shaped connector straps on said engine section lowermost front cross frame element.

7. The improvement defined in claim 6 further including two J-shaped bumper straps on each of the J-shaped connector straps on said engine section lowermost front cross frame element.

8. The improvement defined in claim 7 further including a cargo bed section starboard side upper axial frame element connected at one end thereof to said cab section rear starboard side upright frame element and at another end thereof to said cargo bed section rear crossframe element.

9. The improvement defined in claim 8 further including a cargo bed section port side upper axial frame element connected at one end thereof to said cab section rear port side upright frame element and at another end thereof to said cargo bed section rear crossframe element.

10. In a land vehicle having a front bumper, a rear bumper, a cab section having a windshield on a front section thereof and a rear wall on a rear section thereof a starboard side door and a port side door, a front engine compartment located between the front bumper and the cab section, a cargo bed section located between the cab section and the rear bumper, doors on the cab section, a longitudinal centerline extending from the front bumper to the rear bumper and dividing the land vehicle into a starboard side and a port side, wheel wells on the starboard and port sides of the vehicle, the improvement in combination therewith consisting entirely of:
an integral, one-piece, monolithic frame mounted on the vehicle and surrounding the vehicle, said frame including (1) a starboard side axial frame element having a front end located in front of the vehicle front bumper and a rear end located in back of the vehicle rear bumper, (2) a port side axial frame element having a front end located in front of the vehicle front bumper and a rear end located in back of the vehicle rear bumper, (3) two U-shaped wheel wells in each of said axial frame elements, each wheel well including a front upright element, a rear upright element and an axially extending element connecting said front and rear upright elements together and being located immediately above and adjacent to one of the vehicle wheels, (4) a grille section starboard side upright element connected to said starboard side axial frame element front end and including a top end, (5) a grille section port side upright element connected on one end thereof to said starboard side axial frame element front end and including a top end, (6) a grille section lowermost crossframe element connected at one end to said grille section starboard side upright element and at another end thereof to said grille section port side upright element and extending across the vehicle in front of the vehicle front bumper, said grille section lowermost crossframe element including a U-shaped section having two axially extending legs connected by a crossframe extending leg, (7) a grille section uppermost crossframe element connected at one end to said grille section starboard side upright element upper end, and at another end thereof to said grille section port side upright element upper end and extending across the vehicle in front of and above the vehicle grille, (8) a grille section middle crossframe element connected at one end to said grille section starboard upright element at an intersection of said grille section starboard side upright element and said starboard side axial frame element and at another end thereof to said grille section port side upright element at an intersection of said grille section port side upright element and said port side axial frame element and extending across the vehicle in front of the vehicle grille, said grille section middle crossframe element including a U-shaped section having two axially extending legs connected together by a crossframe extending bight leg, (9) an engine section starboard side axial frame element connected at one end thereof to said grille section starboard side upright frame element top end and extending axially of the vehicle toward the vehicle rear bumper and having a rear end located forwardly adjacent to the vehicle windshield,

(10) an engine section port side axial frame element connected at one end thereof to said grille section port side upright frame element top end and extending axially of the vehicle toward the vehicle rear bumper and having a rear end located forwardly adjacent to the vehicle windshield,

(11) a cab section starboard side upright frame element connected at a lower end thereof to a rear end of said engine section starboard side axial frame element and extending to a top end located above the vehicle cab roof adjacent to the vehicle windshield,

(12) a cab section port side upright frame element connected at a lower end thereof to a rear end of said engine section port side axial frame element and extending to a top end located above the vehicle cab roof adjacent to the vehicle windshield,

(13) a cab section starboard side axial frame element connected at a forward end thereof to the cab section starboard side upright frame element top end and extending axially of the vehicle towards the vehicle rear bumper to a rear end located above and behind the vehicle cab roof,

(14) a cab section port side axial frame element connected at a forward end thereof to the cab section port side upright frame element top end and extending axially of the vehicle towards the vehicle rear bumper to a rear end located above and behind the vehicle cab roof,

(15) a cab section forward crossframe element connected at one end thereof to said cab section starboard side axial frame element at an intersection of said cab section starboard side axial frame element and said cab section starboard side upright frame element top end and extending across the vehicle cab section above and immediately adjacent to the vehicle windshield,

(16) a cab section rear crossframe element connected at one end thereof to said cab section starboard side axial frame element rear end and at another end thereof to said cab section port side axial frame element rear end and extending across the vehicle cab section above and immediately adjacent to the vehicle cab rear wall,

(17) a cab section rear starboard side upright frame element having a top end and a bottom end with said cab section rear starboard side upright frame element top end being connected to said cab section starboard side axial frame element rear end and said cab section rear starboard side upright frame element lower end being connected to said starboard side axial frame element and being located immediately adjacent to and behind the vehicle starboard side door,

(18) a cab section rear port side upright frame element having a top end and a bottom end with said cab section rear port side upright frame element top end being connected to said cab section starboard side axial frame element rear end and said cab section rear port side upright frame element lower end being connected to said port side axial frame element and being located immediately adjacent to and behind the vehicle port side door,

(19) a cab section forward starboard side upright frame element having a bottom end connected to said starboard side axial frame element and a top end connected to said engine section starboard side axial frame element rear end and being located adjacent to and forward of the vehicle starboard side door,

(20) a cab section forward port side upright frame element having a bottom end connected to said port side axial frame element and a top end connected to said engine section port side axial frame element rear end and being located adjacent to and forward of the vehicle port side door, and

(21) a cargo bed section rear crossframe element connected at one end thereof to said starboard side axial frame element rear end and at another end thereof to said port side axial frame element rear end and extending across the vehicle adjacent to the vehicle rear bumper.

* * * * *